(12) United States Patent
Lavretsky

(10) Patent No.: US 8,382,562 B1
(45) Date of Patent: Feb. 26, 2013

(54) DEBONING KNIFE

(76) Inventor: Philip Lavretsky, Xenia, OH (US)

( * ) Notice: Subject to any disclaimer, the term of this patent is extended or adjusted under 35 U.S.C. 154(b) by 0 days.

(21) Appl. No.: 13/437,964

(22) Filed: Apr. 3, 2012

(51) Int. Cl.
*A22B 3/10* (2006.01)
*A22C 17/02* (2006.01)

(52) U.S. Cl. .......................... 452/137; 452/102; 452/103

(58) Field of Classification Search .......... 452/102–105, 452/137
See application file for complete search history.

(56) References Cited

U.S. PATENT DOCUMENTS

| | | | | |
|---|---|---|---|---|
| 954,084 A * | 4/1910 | Gelbman | ...................... | 452/137 |
| 984,013 A * | 2/1911 | Maisel | .......................... | 452/137 |
| 1,226,797 A * | 5/1917 | Newman | ..................... | 30/123.5 |
| 1,362,143 A * | 12/1920 | Rohrer | .......................... | 452/103 |
| 1,847,062 A * | 2/1932 | Lemmon, Jr. | .................. | 30/304 |
| 2,030,463 A * | 2/1936 | Nelms | .......................... | 452/137 |
| 2,066,417 A * | 1/1937 | Nelms | .......................... | 452/137 |
| 2,142,197 A * | 1/1939 | Louis | ............................ | 452/137 |
| 2,335,013 A | 4/1943 | Kennet | | |
| 2,793,392 A | 5/1957 | Cutrera | | |
| 3,667,470 A * | 6/1972 | Rubin | ............................ | 606/84 |
| 4,006,514 A * | 2/1977 | Penman | ....................... | 452/137 |
| 4,288,921 A * | 9/1981 | Rhynes | .......................... | 30/304 |
| 4,574,431 A * | 3/1986 | Colling | ......................... | 452/137 |
| 4,969,267 A | 11/1990 | Anenberg | | |
| 5,447,516 A | 9/1995 | Gardner | | |
| 5,529,534 A * | 6/1996 | Adams | ......................... | 452/135 |
| 6,745,477 B2 | 6/2004 | Gray | | |
| 7,743,512 B1 * | 6/2010 | Whittemore | .................... | 30/304 |

* cited by examiner

*Primary Examiner* — David Parsley
(74) *Attorney, Agent, or Firm* — R. William Graham

(57) ABSTRACT

A knife for deboning rib meat from ribs includes a plurality of spaced apart blades arranged in side by side relation, each blade having forward end, a rearward end and a sharp bottom edge, a deboning head transversely interconnecting the blades and which includes a sharp bottom edge, wherein a sharp grooved surface interconnects a forward end of both blades and the deboning head and a handle connected to the rearward end of the blades. The sharp grooved surface is contoured to a rib of predetermined animal.

8 Claims, 2 Drawing Sheets

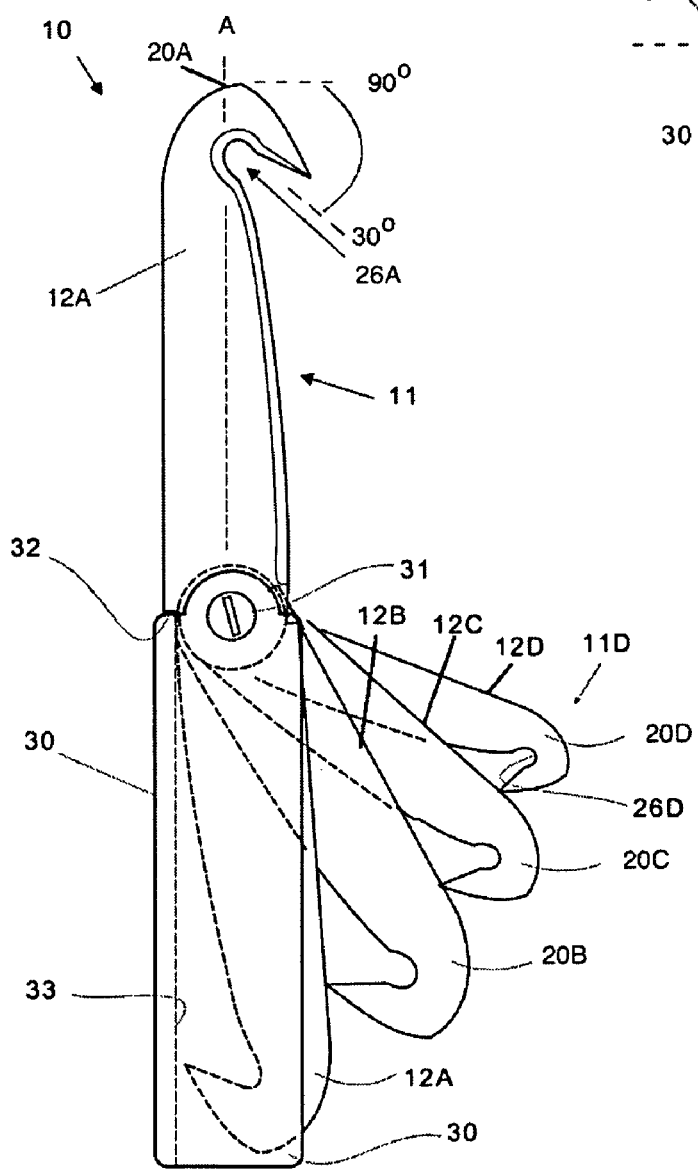
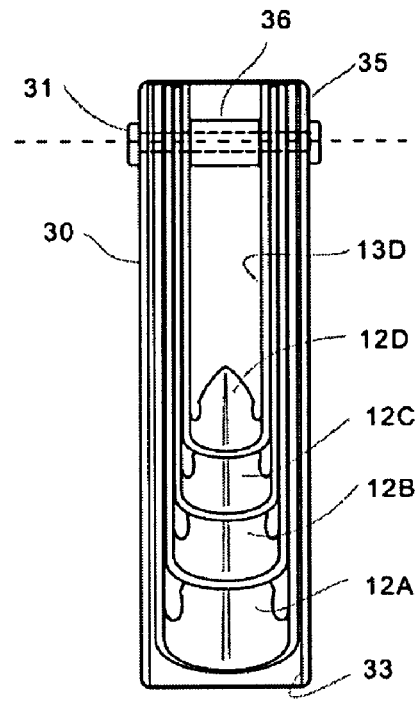
Fig. 5
Fig. 6

DEBONING KNIFE

BACKGROUND OF INVENTION

Below are the measurements that are needed:
1. Field of Invention

The present invention is directed to a cutting tool for removing the meat from a carcass. More particularly, the cutting tool is a deboning knife that slices rib meat from rib bones.

2. Background of the Invention

Removing the meet from the ribs of an animal can be difficult due to its size and shape, and its attachment. This is particularly a problem when deer hunting. Typically, one is required to haul the kill back from a kill zone to an area where the deboning of meat can take place which is done manually.

Hunters commonly remove the meat from a carcass using a cutting tool such as a knife. The method for manually removing the meat from ribs comprises inserting a knife adjacent one rib and performing one lengthwise slice along the rib to release the tendons connecting the meat thereto. Then to an opposing rib, the knife is inserted adjacent the opposing rib and another lengthwise slice is performed to release the tendons connecting to that rib and thereby provide a strip of meat.

Severing the tendons from the carcass in separate cutting actions is presently time consuming to hunters in the field. A conventional deboning knife blade is generally flat and not easy to work with for cutting jerky. The user repeatedly repositions the knife during use to better accommodate the shape of the rib it is cutting against. Thus, cutting meat strips currently requires time and skill.

For the foregoing reasons, there is a need for a deboning or rib knife which is particularly well suited to reduce the time required to remove rib meat and enable performing such rib meat removal at the site of the kill and ridding the need to carry the unwanted part of the carcass (i.e., ribs) back to a particular area where deboning is currently performed.

SUMMARY

It is an object to improve knives.

It is a further object to reduce the time required to debone rib meat.

It is a further object of the present invention to provide a knife that reduces the time required to remove the rib meat from a ribs of a carcass.

It is still another object to improve hunting experience.

It is a further object to provide a knife for cutting jerky strips.

Accordingly, the present invention is directed to a knife for deboning rib meat from ribs. The knife includes a plurality of spaced apart blades each having a sharp bottom edge arranged in side by side relation and include a deboning head which transversely interconnects the blades and which also includes a sharp bottom edge. In this regard, the deboning head can be configured with a sharp spike which can be angled or pitched to provide an aggressive angle of attack. The angle can be varied depending on animal species as well as providing a way to cut meat into strips for jerky.

Also, there can be provided with a sharp grooved surface at a forward end of both blades which are located proximate connection area of the deboning head. Each grooved surface is designed to slide along a respective rib and cut the tendons of the meat as it slides along the rib bone.

A rearward end of each blade is pivotally connected to an end of a handle. The handle can include a stop which serves as a lock or brace for the blades when pivoted to an open working position. Optionally, the blades can be slidably connected to the handle wherein each blade includes an open bearing surface to slide on one or more protruding bearing surfaces connected to the handle.

To remove the rib meat with the deboning knife of the present invention, the deboning head pierces between opposing ribs until the grooved surfaces engage the opposing rib surfaces. This is coined as "seating the knife." Once seated, one draws the knife lengthwise along the ribs maintaining the knife in a seated position. By so doing, the tendons are uniformly cut and a strip of meat is produced and is extruded through an opening between the blades.

BRIEF DESCRIPTION OF DRAWINGS

Reference is made to the accompanying drawings in which are shown illustrative embodiments of the invention and from which novel features and advantages will be apparent.

FIG. 5 is side of another embodiment of the invention depicting multiple deboning blades in a single handle.

FIG. 6 depicts a back view of the embodiment of FIG. 4 showing the blades nested in a closed position.

DETAILED DESCRIPTION

Figures 3, 4:
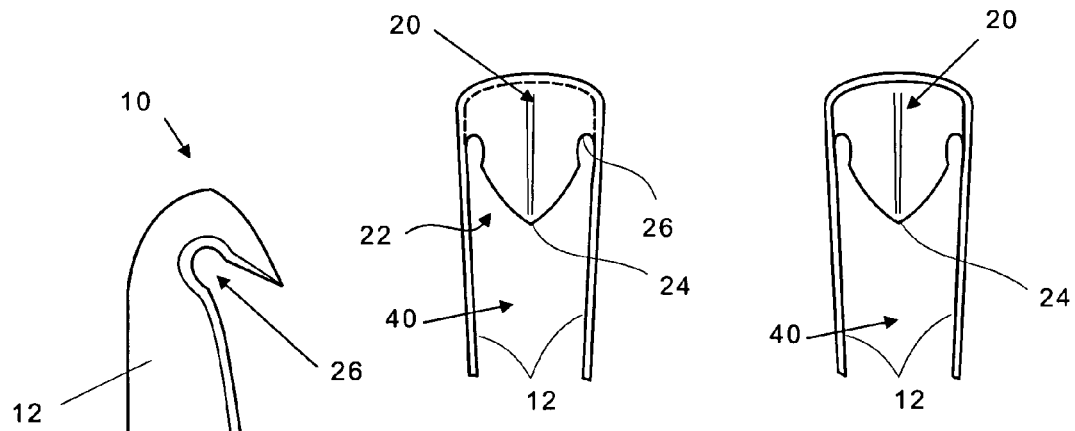
FIG. 3 is a front view of part of the deboning knife in FIG. 1.
FIG. 4 is a back view of part of the deboning knife in FIG. 1.

Referring now to the drawings. The present invention is a cutting tool and method for removing rib meat from a carcass and particularly forming strips of rib meat.

The present invention includes a rib or deboning knife (10) as seen in embodiments FIGS. 1-4 or as seen in FIGS. 5-6 wherein multiple blades 12A, 12B, 12C and 12D and their respective deboning heads 20A, 20B, 20C and 20D nest. Knife (10) includes a cutting member (11) which has plurality of spaced apart blades (12). Each blade (12) has a sharp bottom edge (14) which can extend from a rearward end (16) to a forward end (18) thereof. The blades (12) are arranged in side by side generally parallel relation. It should be understood that one of each of the blades (12) forms a left and a right blade which are of the same general size and shape and being a mirrored image of each other.

A deboning head (20) interconnects the blades (12) and includes a sharp bottom edge (22) which is generally transversely disposed to the blades (12). In this regard, the deboning head (20) can be configured with a sharp spike (24) which can be angled or pitched backward toward a handle (30) connected to the blades (12) to provide an aggressive angle of attack. The angle is configured at between about 90 and 30 degrees pitch relative to a longitudinal axis A f the blades (12). The angle can be varied depending on animal species as well as providing a way to cut meat into strips for jerky. For example, a pitch angle of between less than or equal to about 90 degrees relative to a longitudinal axis (A) of the blades (12) is thought suitable. Thus as depicted in FIGS. 5 and 6, there are a number of blades 12A, 12B, 12C and 12D which are nested respectively. The appropriate size blade can be moved to an open position for the particular animal size to be deboned.

Also, there can be provided a sharp nook or grooved surface (26) at the forward end (18) of both blades which are located proximate connection area of the deboning head (20). Each grooved surface 26 is designed to slide along a respective rib and cut the tendons of the meat as it slides along the rib bone. The spike (24) can preferably be at a central terminus of the deboning head (20) and acts in the initial incising part of the knife (10) prior to the meat tendons being cut by grooved surfaces 26.

In one embodiment, the rearward end (16) of each blade (12) is by way of example pivotally connected to an end of the handle (30) by means of a screw and threaded receiving member (31). The attaching mechanisms can include pins, screws, rivets or other suitable connectors or cooperating nuts and bolts. The handle (30) is preferably made of plastic, but other suitable materials such as metals may be used instead. The attached handle (30) provides a hand grip with which the user can manipulate the cutting member (11). In addition, the handle (30) supports the blades (12) at a predetermined distance apart.

Figures 1, 2:
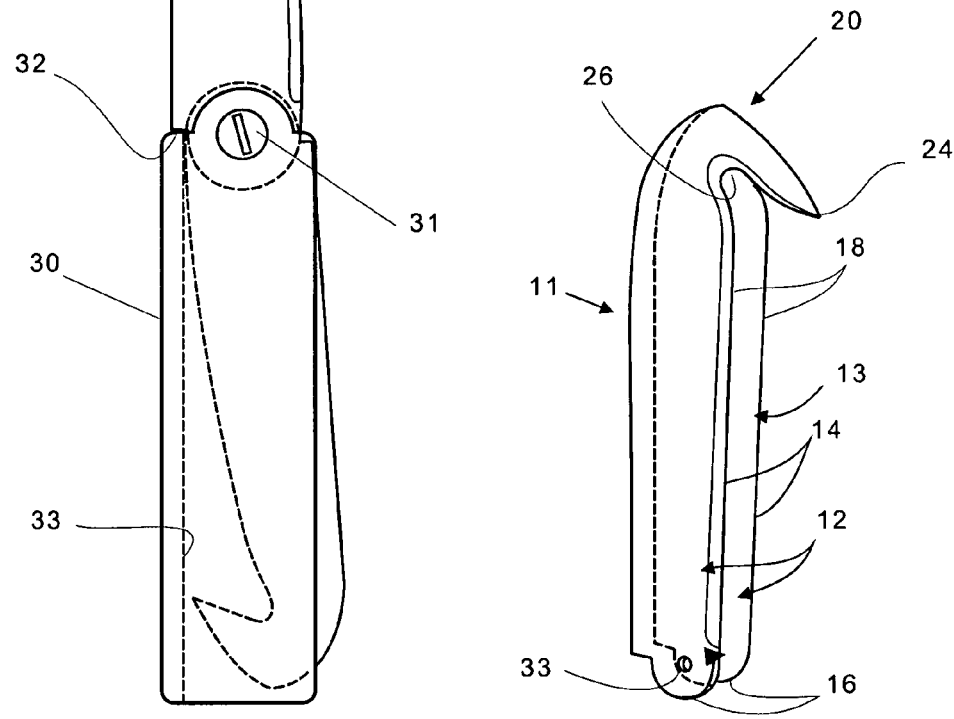
FIG. 1 is a side view of a deboning knife of the present invention.
FIG. 2 is a perspective view of part of the deboning knife in FIG. 1.

The handle (30) can include a stop (32) which serves as a lock or brace for the blades (12) when pivoted to an open working position as seen in FIG. 1. Although not shown it is conceived that the blades (12) can be slidably connected to the handle (30) wherein each blade (12) can include an open bearing surface to slide on one or more protruding bearing surfaces connected to the handle (30).

The blades (12) and deboning head (20) can include non-stick material either as part of the surface or on the surface thereof to permit the meat to readily slide between an opening (40) between the two blades (12) as the knife (10) cuts the rib meat off the rib bone.

To remove the rib meat with the deboning knife (10) of the present invention, the deboning head 20 pierces between opposing ribs until the grooved surfaces (26) engage the opposing rib surfaces. This is coined as "seating the knife." Once seated, one draws the knife (10) lengthwise along the ribs maintaining the knife in a seated position. By so doing, the tendons are uniformly cut and a strip of meat is produced and is extruded through the opening (40) between the blades (12).

As seen in the drawings, the knife (10) is able to open and shut (or slide) in the closed position is locked with the deboning head (20) inside an open surface area (33) of handle (30) which houses the head (20) and blades (12) and thus prevent injury or damage to oneself or items in contact with the knife (10) from occurring while not in use.

There can be a nonstick coating on as part of the blades (12) to help the meat glide between the blades (12) and prevent possible build up or clogging. The plurality of blades (12) and the deboning head (20) can preferably be made of stainless steel and are rigid enough to resist permanent deformation during use. Suitable metals may be substituted for stainless steel to fabricate the same.

The deboning knife (10) is sized and shaped to remove the rib meat from a deer carcass with a minimum amount of waste and can have a length of less than 20 inches to render the same suitable for ease of use. In a preferred embodiment, the overall length of the knife (1) is approximately inches with the blades preferably having an effective length of less than about 10 inches. The blades (12) can be spaced apart a distance less than 2 inches and to accommodate the particular animal. The deboning head (20) ranges in width from about 0.2 to 2 inches with the spike (24) having a length of less than about 1 inch.

In a preferred embodiment as shown in the drawings, the rearward end (16) of each blade (12) is connected to the handle (30) by connecting means (31). Each blade 12 can include a hole (15) which are aligned with a respective attaching hole (33) of the handle (30). A locking pin (35) extends through respective aligned holes (15) on the blades (12) and through respective aligned attaching hole (35) to secure the handle (30) and blades (12) together as a unit.

A preferred method for removing the rib meat from a carcass comprises the following steps of providing a deboning knife, positioning the knife on the upper end of the rib cage of the carcass and inserting the deboning head of the knife into the carcass at that location and seating the knife as described above. Once the knife is inserted into the carcass, the steps include drawing the grooved surfaces (26) down the ribs and separating the tendons from the ribs wherein the rib meat is pulled through and between the blades (12).

The deboning knife (10) and the method for removing the rib meat of the present invention reduces the amount of time and effort required to manually remove the same. Consequently, the present invention significantly aids the hunter in the field by reducing the time to debone the ribs as well as the work to carry the carcass out of the kill zone prior to deboning.

Although the present invention has been described in considerable detail with reference to certain preferred versions thereof, other versions are possible. Therefore, the spirit and scope of the appended claims should not be limited to the description of the preferred versions contained herein.

What is claimed is:

1. A knife for deboning rib meat from ribs, which includes:
   a first plurality of generally parallel spaced apart left and right blades arranged in side by side relation, each first blade having forward end, a rearward end and a sharp bottom edge and wherein each forward end includes a sharp nook which is contoured to a rib of a first predetermined animal;
   a handle connected to said rearward end of said first blades wherein an opening extends substantially from said rearward ends proximate said forward ends such that deboned meat can pass between and through said blades;
   a first deboning head transversely interconnecting said forward ends of said first blades and is configured with a sharp spike which is pitched rearwardly toward said handle and between said first blades to provide an aggressive angle of attack and which includes a sharp bottom edge;
   a second plurality of generally parallel spaced apart left and right blades arranged in side by side relation, each second blade having forward end, a rearward end and a sharp bottom edge and wherein each forward end of each said second blade includes a sharp nook which is contoured to a rib of a second predetermined animal;
   said handle connected to said rearward end of said second blades wherein an opening extends substantially from said rearward ends of said second blades proximate said forward ends of said second blades such that deboned meat can pass between and through said second blades; and
   a second deboning head transversely interconnecting said forward ends of said second blades and is configured with a sharp spike which is pitched rearwardly toward said handle and between said second blades to provide an aggressive angle of attack and which includes a sharp bottom edge, and wherein one of said first blades and first deboning head and said second blades and deboning head nest within the other when in a closed position.

2. The knife of claim 1, wherein said angle of said second deboning head is configured at between about 90 and 30 degrees pitch relative to a longitudinal axis of said blades.

3. The knife of claim 1, wherein said rearward end of each said blade is movably connected to an end of said handle.

4. The knife of claim 3, wherein said handle includes a stop which serves as a lock or brace for said blades when pivoted to an open working position.

5. The knife of claim 1, wherein the said first left and right blades are spaced apart predetermined distances and said predetermined distances include a minimum predetermined distance of approximately 0.2 inches.

6. The knife of claim 5, wherein the predetermined distances between said second left and right blades include a maximum predetermined distance of approximately 4 inches.

7. The knife of claim 1, wherein said blades are made to resist permanent deformation.

8. The knife of claim 1, wherein each said spike extends outward beyond each said respective bottom edge of said first blades and said second blades.

* * * * *

UNITED STATES PATENT AND TRADEMARK OFFICE
CERTIFICATE OF CORRECTION

PATENT NO. : 8,382,562 B1
APPLICATION NO. : 13/437964
DATED : February 26, 2013
INVENTOR(S) : Philip Lavretsky Page 1 of 1

It is certified that error appears in the above-identified patent and that said Letters Patent is hereby corrected as shown below:

In the Specification:

Column 1, line 12; The portion of the sentence reading: 'meet' should read -meat-.

Column 1, line 27; Cancel the text "A conventional deboning knife blade is generally flat and not easy to work with for cutting jerky.".

Column 2, line 58; The portion reading: 'f' should read -of-.

In the Claims:

Column 3, line 4; The portion of the sentence reading: '26' should read -(26)-.

Column 3, line 9; The portion of the sentence reading: '26' should read -(26)-.

Column 3, line 34; The portion of the sentence reading: '20' should read -(20)-.

Column 3, line 67; The portion of the sentence reading: '12' should read -(12)-.

Signed and Sealed this
Third Day of December, 2013

Margaret A. Focarino
*Commissioner for Patents of the United States Patent and Trademark Office*